US011859154B2

(12) United States Patent
Piorkowski et al.

(10) Patent No.: US 11,859,154 B2
(45) **Date of Patent: *Jan. 2, 2024**

(54) UNIT DOSE PACKS WITH ANTI-EFFLORESCENCE FORMULATIONS

(71) Applicant: Henkel IP & Holding GmbH, Düsseldorf (DE)

(72) Inventors: Daniel T. Piorkowski, Fairfield, CT (US); Casey Camire, Wallingford, CT (US)

(73) Assignee: Henkel AG & Co. KGaA, Düsseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/451,396

(22) Filed: Oct. 19, 2021

(65) Prior Publication Data

US 2022/0033746 A1 Feb. 3, 2022

Related U.S. Application Data

(63) Continuation of application No. 16/547,845, filed on Aug. 22, 2019, now Pat. No. 11,193,096.

(51) Int. Cl.
*C11D 17/04* (2006.01)
*C11D 1/22* (2006.01)
(Continued)

(52) U.S. Cl.
CPC .............. *C11D 17/043* (2013.01); *C11D 1/22* (2013.01); *C11D 1/29* (2013.01); *C11D 1/722* (2013.01);
(Continued)

(58) Field of Classification Search
None
See application file for complete search history.

(56) References Cited

U.S. PATENT DOCUMENTS 6,534,462 B1 * 3/2003 Hamilton ........... C11D 3/38618 510/505
10,907,118 B2 * 2/2021 Piorkowski .......... C11D 17/043
(Continued)

FOREIGN PATENT DOCUMENTS

CN 109576097 A 4/2019
JP 2018188653 A 11/2018

OTHER PUBLICATIONS

International Search Report and Written Opinion for Application No. PCT/US2020/047624 dated Dec. 2, 2020 (9 pages).

*Primary Examiner* — Lorna M Douyon
(74) *Attorney, Agent, or Firm* — St. Onge Steward Johnston & Reens LLC

(57) ABSTRACT

Unit dose packs and methods of producing and using the same are provided, where the unit dose packs have reduced efflorescence. In accordance with one embodiment, the unit dose pack includes a wash composition encapsulated within a film. The wash composition includes a reverse poloxamer present in an amount of from about 8 to about 20 weight percent, glycerin present in an amount of from about 0 to about 30 weight percent, polyethylene glycol present in an amount of from about 0 to about 30 weight percent, an anionic surfactant present in an amount of from about 9 to about 18 weight percent, a non-ionic surfactant present in an amount of from about 15 to about 30 weight percent, and a linear alkylbenzene sulfonic acid present in an amount of from about 4 to about 8 weight percent, all based on a total weight of the wash composition.

19 Claims, 1 Drawing Sheet

(51) Int. Cl.

| | |
|---|---|
| ***C11D 1/29*** | (2006.01) |
| ***C11D 1/722*** | (2006.01) |
| ***C11D 1/83*** | (2006.01) |
| ***C11D 3/20*** | (2006.01) |
| ***C11D 3/30*** | (2006.01) |
| ***C11D 3/37*** | (2006.01) |
| ***C11D 3/386*** | (2006.01) |
| ***C11D 3/42*** | (2006.01) |
| ***C11D 11/00*** | (2006.01) |
| ***C11D 3/50*** | (2006.01) |

(52) U.S. Cl.

CPC .............. *C11D 1/83* (2013.01); *C11D 3/2065* (2013.01); *C11D 3/30* (2013.01); *C11D 3/3707* (2013.01); *C11D 3/386* (2013.01); *C11D 3/42* (2013.01); *C11D 3/50* (2013.01); *C11D 11/0017* (2013.01)

(56) References Cited

U.S. PATENT DOCUMENTS

| | | | | |
|---|---|---|---|---|
| 11,193,096 | B2 * | 12/2021 | Piorkowski .......... | C11D 17/043 |
| 2002/0142931 | A1 | 10/2002 | DeNome et al. | |
| 2003/0092593 | A1 | 5/2003 | Farooq et al. | |
| 2014/0100153 | A1 * | 4/2014 | Martinez-Crowley ...................... | C11D 3/044 510/495 |
| 2014/0123401 | A1 * | 5/2014 | Cordellina ............ | C11D 3/046 510/337 |
| 2016/0075976 | A1 | 3/2016 | Andersen et al. | |
| 2016/0280869 | A1 | 9/2016 | Nii et al. | |
| 2017/0198243 | A1 | 7/2017 | Mussmann et al. | |
| 2018/0334641 | A1 | 11/2018 | Piorkowski | |
| 2019/0112563 | A1 | 4/2019 | Piorkowski | |
| 2019/0127669 | A1 | 5/2019 | Piorkowski et al. | |
| 2019/0161705 | A1 | 5/2019 | Delplancke et al. | |

* cited by examiner

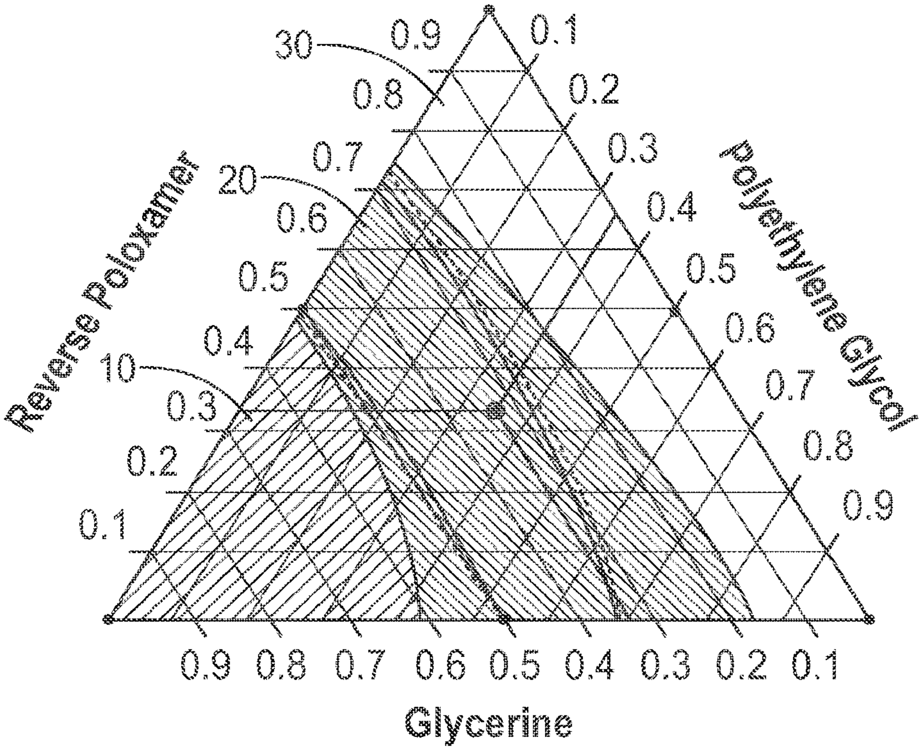
30
20
10
0.9
0.8
0.7
0.6
0.5
0.4
0.3
0.2
0.1
Reverse Poloxamer
0.1
0.2
0.3
0.4
0.5
0.6
0.7
0.8
0.9
Polyethylene Glycol
0.9 0.8 0.7 0.6 0.5 0.4 0.3 0.2 0.1
Glycerine

UNIT DOSE PACKS WITH ANTI-EFFLORESCENCE FORMULATIONS

CROSS-REFERENCE TO RELATED APPLICATIONS

This application is a continuation of U.S. application Ser. No. 16/547,845, filed Aug. 22, 2019, now U.S. Pat. No. 11,193,096, issued Dec. 7, 2021, titled Unit Dose Packs with Anti-Efflorescence Formulations, which is herein incorporated by reference in its entirety.

FIELD OF THE INVENTION

The technical field relates to unit dose packs and methods of producing the same, and more particularly relates to unit dose packs with reduced efflorescence and methods of producing the same.

BACKGROUND OF THE INVENTION

Detergent in unit dose packs is available for a variety of washing activities, such as garment laundering and dish washing. The unit dose pack provides a pre-measured quantity of detergent that is easy to carry and convenient to use. The unit dose pack minimizes over-dosage of detergent and has proven popular with consumers.

Many unit dose packs include a wash composition that is encapsulated within a pouch made of a water soluble film, where the wash composition includes detergent, solvents, and other components useful for cleaning or other purposes. In many cases, the film is clear, so the contents are visible. Some materials in the wash composition can cause efflorescence in the film, where efflorescence is the migration of a salt or other solid to the surface of a solid. In the case of unit dose packs, materials that include sodium tend to effloresce in the film such that the film appears "grainy" or "hazy." The film may also feel "gritty" to the touch. The grainy appearance and feel of a film with efflorescence may be negatively perceived by consumers.

The wash composition of a unit dose pack is encapsulated within a film, so the contents of the wash composition need to be compatible with the film. The film is water soluble, so solvents and other ingredients of the wash composition need to result in a stable film. The wash composition may include water as a solvent, and other non-aqueous solvents or ingredients may help stabilize the film in the presence of the water. Film haptics can be measured, where the film haptics indicate the stability of the film when exposed to the wash composition.

Accordingly, it is desirable to provide a unit dose pack where the wash composition resists efflorescence, including methods of producing and using the same. In addition, it is desirable to provide unit dose packs where the film is stable, with good haptics, when exposed to the wash composition, and methods of producing and using the same. Furthermore, other desirable features and characteristics will become apparent from the subsequent detailed description and the appended claims, taken in conjunction with the accompanying drawings and the foregoing technical field and background.

BRIEF SUMMARY OF THE INVENTION

A unit dose pack is provided in another embodiment. The unit dose pack includes a wash composition and a film encapsulating the wash composition. The wash composition includes a reverse poloxamer present in an amount of from about 8 to about 20 weight percent, glycerin present in an amount of from about 0 to about 30 weight percent, polyethylene glycol present in an amount of from about 0 to about 30 weight percent, an anionic sodium alcohol ethoxy sulfate surfactant present in an amount of from about 9 to about 18 weight percent, a non-ionic alcohol ethoxylate surfactant present in an amount of from about 15 to about 30 weight percent, and a linear alkylbenzene sulfonic acid present in an amount of from about 4 to about 8 weight percent, all based on a total weight of the wash composition.

A unit dose pack is provided in yet another embodiment. The unit dose pack includes a wash composition encapsulated within a film. The wash composition comprises a reverse poloxamer at from about 3 to about 30 weight percent, and an anionic sodium alcohol ethoxy sulfate surfactant present in an amount of from about 3 to about 27 weight percent, all based on a total weight of the wash composition.

Unit dose packs and methods of producing and using the same are provided. In accordance with one embodiment, a unit dose pack includes a wash composition and a film encapsulating the wash composition. The wash composition consists of a reverse poloxamer present in an amount of from about 8 to about 20 weight percent, glycerin present in an amount of from about 0 to about 30 weight percent, polyethylene glycol present in an amount of from about 0 to about 30 weight percent, an anionic sodium alcohol ethoxy sulfate surfactant present in an amount of from about 9 to about 18 weight percent, a non-ionic alcohol ethoxylate surfactant present in an amount of from about 15 to about 30 weight percent, a linear alkylbenzene sulfonic acid present in an amount of from about 4 to about 8 weight percent, water present in an amount of from about to about 35 weight percent, a coconut fatty acid present in an amount of from about 2 to about 10 weight percent, an optical brightener present in an amount of from about 0.01 to about 0.5 weight percent, a fragrance present in an amount of from about 0 to about 2 weight percent, a bittering agent present in an amount of from about 0.005 to about 0.25 weight percent, and an enzyme present in an amount of from about 0.001 to about 1 weight percent, all based on a total weight of the wash composition.

BRIEF DESCRIPTION OF THE DRAWINGS

The present embodiments will hereinafter be described in conjunction with the following drawing FIGURE, wherein:

FIG. 1 is a triangular graph illustrating embodiments with non-aqueous solvent percentages.

DETAILED DESCRIPTION OF THE INVENTION

The following detailed description is merely exemplary in nature and is not intended to limit the unit dose pack, or the method for producing or using the same. Furthermore, there is no intention to be bound by any theory presented in the preceding background or the following detailed description.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

A unit dose pack includes a wash composition encapsulated within a film, where the film may be transparent or colored. The wash composition includes a surfactant, water, non-aqueous solvents, and other components. One of the non-aqueous solvents is a poloxamer, and more particularly a reverse poloxamer. The use of a reverse poloxamer in appropriate concentrations with other solvents reduces or eliminates efflorescence in the film while maintaining good film haptics, such as minimal weight gain of the film when exposed to the wash composition. Without being bound by theory, it is believed that the reverse poloxamer slows the rate of diffusion of salts (such as sodium) from the liquid portion of the unit dose into the polyvinyl alcohol film. It is believed that the reverse poloxamers have a slower rate of diffusion than traditional solvents such as propylene glycol and glycerin. Therefore, the use of a reverse poloxamer is believed to delay or prevent efflorescence of the film, but no literature has been found to support or refute this non-binding hypothesis.

A unit dose pack is formed by encapsulating a wash composition within a container, where the container includes a film. In some embodiments, the film forms one half or more of the container, where the container may also include dyes, print, or other components in some embodiments. The film is water soluble such that the film will completely dissolve when an exterior of the film is exposed to water, such as in a washing machine typically used for laundry. When the film dissolves, the container ruptures and the contents are released. As used herein, "water soluble" means at least 2 grams of the solute (the film in one example) will dissolve in 5 liters of water, for a solubility of at least 0.4 grams per liter (gift at a temperature of 25 degrees Celsius (° C.) unless otherwise specified. Suitable films for packaging are rapidly and completely soluble in water at temperatures of about 5° C. or greater.

The film is desirably strong, flexible, shock resistant, transparent, and non-tacky during storage at both high and low temperatures and high and low humidity's. In an exemplary embodiment, the film is initially formed from polyvinyl acetate, and at least a portion of the acetate functional groups are hydrolyzed to produce alcohol groups. Therefore, the film includes polyvinyl alcohol (PVOH), and may include a higher concentration of PVOH than polyvinyl acetate. Such films are commercially available with various levels of hydrolysis, and thus various concentrations of PVOH. In an exemplary embodiment the film initially has about 85 percent of the acetate groups hydrolyzed to alcohol groups, but other percentages of hydrolysis are also possible in alternate embodiments. Some of the acetate groups may further hydrolyze in use, so the final concentration of alcohol groups may be higher than the concentration at the time of packaging. The film may have a thickness of from about 25 to about 200 microns (μm), or from about 45 to about 100 μm, or from about 65 to about 90 μm in various embodiments. The film may include alternate materials in some embodiments, such as methyl hydroxy propyl cellulose and polyethylene oxide, but the film is water soluble in all embodiments.

The unit dose pack may be formed from a container having a single section, but the unit dose pack may be formed from containers with two or more different sections in alternate embodiments. In embodiments with a container having two or more sections, the contents of the different sections may or may not be the same. In embodiments with two or more sections, at least one of the sections includes the wash composition. The other section may include the same or a different embodiment of the wash composition, but in alternate embodiments the other section includes a different composition, such as a fabric softening composition or other fabric treatment. In some embodiments, the unit dose pack is formulated and configured for cleaning laundry, but other cleaning purposes are also possible. The wash composition is positioned within the container, and the container is sealed to encapsulate and enclose the wash composition. The wash composition is typically in direct contact with the film of the container within the unit dose pack. The film of the container is sealable by heat, heat and water, ultrasonic methods, or other techniques, and one or more sealing techniques may be used to enclose the wash composition within the container.

In an exemplary embodiment, the wash composition is liquid when encapsulated within the container. The liquid wash composition may have a viscosity of from about 100 to about 1,000 centipoise, or from about 100 to about 300 centipoise in different embodiments, where "viscosity," as used herein, means the viscosity measured by a rotational viscometer at a temperature of 25 degrees Celsius (° C.) using an LV02 cylindrical spindle at about 20 revolutions per minute (RPM) with a Brookfield® DV2T viscometer. The liquid form facilitates rapid delivery and dispersion of the wash composition once the container ruptures, and this rapid dispersion can aid cleaning. In alternate embodiments, the wash composition is flowable, such as a gel, a liquid with suspended particulates, or other forms.

In an exemplary embodiment, the unit dose pack is sized to provide a desired quantity of wash composition for one load of laundry or one batch of dishes in a dishwasher. The unit dose pack may also be sized for a fraction of a desired quantity, such as one half of a load of laundry, so a user can adjust the amount of detergent added without having to split a unit dose pack. In an exemplary embodiment, the unit dose pack has a weight of from about 5 to about 50 grams. In alternate embodiments, the unit dose pack is from about 10 to about 40 grams, or from about 15 to about 25 grams.

A plurality of components are combined to form the wash composition, where the wash composition is typically prepared prior to encapsulation within the container. A total weight of the wash composition does not include the weight of the film or the container, where the total weight of the wash composition is generally referenced herein as the basis for the weight percent of components of the wash composition. Unless otherwise specified, the concentration of all components described herein, other than the film, is the weight percent of the named component based on the total weight of the wash composition.

A solvent is a component that is utilized as a carrier in a formulation, where other components (solutes) are dissolved in the solvent. Solvents generally solvate solutes and act as bulk fillers for the formula when used below a certain use-level so as not to plasticize the film. Specific criteria that precisely and exactly define what is or is not a solvent are difficult to define, because some components may have more than one purpose. Generally, solvents for liquid formulations are liquids at standard conditions (i.e., 1 atmosphere pressure and 20 degrees Celsius (° C.)). Typically, ionic surfactants, non-ionic surfactants, optical brighteners, dyes or pigments, bleach activators or agents, enzymes, perfumes or other ingredients added for odor purposes, bittering agents, peroxy compounds, soil release agents, dye transfer inhibitors, foam inhibitors, chelators or other water softeners are not considered "solvents." The wash composition includes water as one solvent, and the wash composition also includes a non-aqueous solvent.

One solvent in the wash composition is water, as mentioned above. Water may be present in the wash composition at a concentration of from about 5 to about 45 weight percent, or present in an amount of from about 5 to about 35 weight percent, or present in an amount of from about 5 to about 28 weight percent, or present in an amount of from about 7 to about 25 weight percent in various embodiments, based on the total weight of the wash composition. The film is soluble in water, and non-aqueous solvents can help the film retain strength while encapsulating the wash composition with the water. The correct ratios of non-aqueous solvents and water allow for a stable unit dose pack with good film haptics.

The wash composition also includes a non-aqueous solvent, and the non-aqueous solvent may include one or more components. The non-aqueous solvent may be present in the wash composition at from about 15 to about 60 weight percent, or at from about 25 to 40 weight percent in different embodiments, based on the total weight of the wash composition. As stated above, the definition of a solvent is not always clear, so in this description the following compounds are defined as "non-aqueous solvents:" glycerol; propylene glycol; ethylene glycol; ethanol; and 4C+ compounds. The term "4C+ compound" refers to one or more of: polypropylene glycol; polyethylene glycol; poloxamers; reverse poloxamers; polyethylene glycol esters such as polyethylene glycol stearate, propylene glycol laurate, and/or propylene glycol palmitate; methyl ester ethoxylate; diethylene glycol; dipropylene glycol; sorbitol; tetramethylene glycol; butylene glycol; pentanediol; hexylene glycol; heptylene glycol; octylene glycol; 2-methyl-1,3-propanediol; xylitol; mannitol; erythritol; dulcitol; inositol; adonitol; triethylene glycol; glycol ethers, such as ethylene glycol monobutyl ether, diethylene glycol monobutyl ether, triethylene glycol monobutyl ether, ethylene glycol monopropyl ether, diethylene glycol monoethyl ether, triethylene glycol monoethyl ether, diethylene glycol monomethyl ether, and triethylene glycol monomethyl ether; tris (2-hydroxyethyl)methyl ammonium methylsulfate; ethylene oxide/propylene oxide copolymers with a number average molecular weight of 3,500 Daltons or less; and ethoxylated fatty acids.

The term "poloxamer," as used herein, means a multi-block polymer with a central unit formed from hydrophobic poloxamer monomer component, where a polymer center of the poloxamer is relatively hydrophobic, as compared to the polymer ends. The "poloxamer" also has a plurality of polymer ends that are relatively hydrophilic, as compared to the polymer center. To be more specific, the solubility of the central unit is about 1 gram of polymer per 1,000 grams of water at 25° C., and the solubility of the polymer ends is about 100 grams of polymer per 1,000 grams of water, again at 25° C., where the solubility is determined based on a polymer comparable to just the polymer center or the polymer end. As such, the polymer center can be distinguished from the polymer ends by the water solubility of the components, where a polymer comparable to the polymer center has a water solubility of 1 gram polymer per 1,000 grams water or less, and a polymer comparable to the polymer ends has a water solubility of about 100 grams of polymer per 1,000 grams of water or more. The polymer ends are primarily formed from a hydrophilic poloxamer monomer component that is different from the hydrophobic poloxamer monomer component. The term "primarily," as used herein, means at least 50% by weight, where it is possible for a limited number of hydrophilic poloxamer monomer components to be incorporated into the polymer ends or a limited number of hydrophobic poloxamer monomer components to be incorporated into the polymer center, not to the extent that the water solubility of the polymer center or the polymer ends falls outside of the range specified above. In a similar manner, the term "reverse poloxamer," as used herein, means a multi-block polymer with a plurality of polymer ends and a polymer center, where the polymer ends are formed from a hydrophobic poloxamer monomer component and the polymer center is formed from a hydrophilic poloxamer monomer component. As such, the polymer center is relatively hydrophilic (compared to the polymer ends) and the polymer ends are relatively hydrophobic (compared to the polymer center.) More specifically, the polymer center has a water solubility of about 1 gram of polymer per 1,000 grams of water or less, at 25° C., and the polymer ends have a water solubility of about 100 grams of polymer per 1,000 grams of water or more, at 25° C. The polymer center is capped by the polymer ends, such that the poloxamer or reverse poloxamer center does not generally include a termination point for the polymer.

In an exemplary embodiment, the reverse poloxamer has two poloxamer ends, so the reverse poloxamer is a tri-block polymer. The hydrophobic poloxamer monomer component is propylene oxide and the hydrophilic poloxamer monomer component is ethylene oxide in an exemplary embodiment, so the reverse poloxamer can be referred to as a PO-EO-PO reverse poloxamer (where PO stands for propylene oxide and EO stand for ethylene oxide.) An exemplary structure is illustrated below, where X may be from 1 to about 35, Y may be from 1 to about 35, and Z may be from about 1 to about 35.

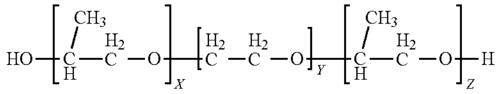

In the illustration above, the X and Z components represent portions of the reverse poloxamer formed from propylene oxide (PO), and the Y component represents a portion of the reverse poloxamer formed from ethylene oxide (EO). The ethylene oxide (EO) to propylene oxide (PO) ratio (the EO/PO ratio) of the reverse poloxamer may be from about 90:10 to about 10:90 in an exemplary embodiment, but in alternate embodiment the EO/PO ratio may be from about 50:50 to about 90:10, or from about 40:60 to about 60:40. The EO/PO ratio is based on the mass of the EO and PO monomer components present in the reverse poloxamer. In embodiments where the reverse poloxamer primarily or exclusively comprises EO and PO, the polymer center may include at least 2 PO monomers covalently bound together and no EO monomers covalently bound together, and each of the polymer ends may include at least 2 EO monomers covalently bound together and no PO monomers covalently bound together.

In an exemplary embodiment, from about 90 to about 100 percent of the hydrophobic poloxamer monomer components are propylene oxide, from about 90 to about 100 percent of the hydrophilic poloxamer monomer components are ethylene oxide, and the reverse poloxamer includes from about 0 to about 20 percent hydrophilic and/or hydrophobic poloxamer monomer components that are not EO or PO, where the monomer percentages are weight/weight (i.e., weight of specific component compared to the weight of the named category, such as weight of propylene oxide compared to weight of the hydrophobic poloxamer monomer components.) In an alternate embodiment, about 100 percent of the hydrophobic poloxamer monomer component is propylene oxide, and about 100 percent of the hydrophilic poloxamer monomer component is ethylene oxide.

It is hypothesized that the hydrophobic ends of the reverse poloxamer have little interaction with the water soluble film, and testing indicates use of the reverse poloxamer as a component of the non-aqueous solvents reduces efflorescence in the film, while maintaining good film haptics. However, there is no intention to be bound by theory in this disclosure. Testing results are detailed further below. The reverse poloxamer may be present in the non-aqueous solvent at from about 10 to about 80 weight percent, based on a total weight of the non-aqueous solvent, or from about 30 to about 80 weight percent in an alternate embodiment. In reference to the entire wash composition, the reverse poloxamer may be present at from about 3 to about 30 weight percent, based on the total weight of the wash composition. In an alternate embodiment, the reverse poloxamer may be present in the wash composition at from about 8 to about 30 weight percent, or from about 8 to about 20 weight percent, based on the total weight of the wash composition. The reverse poloxamer may have a number average molecular weight of from about 300 to about 5,000 in an exemplary embodiment, but other number average molecular weights are also possible.

The non-aqueous solvent may include other components as well, such as polyethylene glycol is in some embodiments. The polyethylene glycol may be present at from about 0 to about 50 weight percent of the wash composition, or from about 0 to about 30 weight percent of the wash composition, or from about 5 to about 30 weight percent of the wash composition, based on the total weight of the wash composition. In some embodiments, the wash composition is free of polyethylene glycol. As used herein, "free of" means the named component is present in an amount of about 1 weight percent or less, based on a total weight of the named composition (such as the wash composition), unless otherwise specified. If a component is specified as being present at a concentration of less than about 1 weight percent, but more than 0 percent, the wash composition is not considered "free of" that component. The polyethylene glycol may have a number average molecular weight in the range from about 200 to about 1000 daltons in an exemplary embodiment, but other average molecular weights may be utilized in alternate embodiments. Glycerin may also be present in the non-aqueous solvents at from about 0 to about 70 weight percent, based on the total weight of the non-aqueous solvents, or from about 0 to about 30 weight percent based on the total weight of the wash composition. Other non-aqueous solvents as listed above may also be present in the wash composition, such as from about 0 to about 30 weight percent based on the total weight of the wash composition. The quantity and ratio of the non-aqueous solvents relative to the water should be adjusted to provide a film with suitable haptics, as discussed below, so the quantities of the components of the non-aqueous solvent are limited to internal ratios with limited efflorescence and satisfactory film haptics.

The wash composition includes other components as well. For example, the wash composition may include one or more ionic surfactants, where the ionic surfactant is formulated for laundry in an exemplary embodiment. The ionic surfactant may include one or more surfactants, including cationic and/or anionic surfactants, in various embodiments. The ionic surfactant may be present in the wash composition at a concentration of from about 5 to about 55 weight percent in one embodiment, but the ionic surfactant may be present in the wash composition at a concentration of about 5 to about 45 weight percent, or from about 10 to about 40 weight percent, or from about 10 to about 35 weight percent, or from about 15 to about 30 weight percent in alternate embodiments, based on a total weight of the wash composition.

Suitable ionic surfactants that are anionic include soaps which contain sulfate or sulfonate groups, including those with alkali metal ions as cations. In an exemplary embodiment, the wash composition includes an anionic sodium alcohol ethoxy sulfate surfactant at from about 3 to about 27 weight percent, or from about 6 to about 24 weight percent, or from about 6 to about 21 weight percent, or from about 9 to about 18 weight percent in alternate embodiments, based on a total weight of the wash composition. Usable soaps include alkali metal salts, amine salts, or other salts of saturated or unsaturated fatty acids with 12 to 18 carbon (C) atoms. Such fatty acids may also be used in incompletely neutralized form, such that some of the fatty acids are present in a salt form and other fatty acids are present in a free acid form where an acid group is protonated. Usable ionic surfactants of the sulfate type include sulfuric acid semi esters of fatty alcohols with 12 to 18 C atoms, and/or alcohol ethoxysulfates, where these compounds may be present in a salt form. Usable ionic surfactants of the sulfonate type include alkane sulfonates with 12 to 18 C atoms and olefin sulfonates with 12 to 18 C atoms, such as those that arise from the reaction of corresponding monoolefins with sulfur trioxide. Another type of sulfonate surfactant includes alpha-sulfofatty acid esters such as those that arise from the sulfonation of fatty acid methyl or ethyl esters, and lauryl ether sulfates.

In an exemplary embodiment, the wash composition includes linear alkyl benzene sulfonic acid surfactants as the ionic surfactant at a concentration of from about 1 to about 15 weight percent, or from about 2 to about 12 weight percent, or from about 4 to about 8 weight percent in different embodiments. In an exemplary embodiment, linear alkylbenzene sulfonates include 9 to 14 C atoms in the alkyl moiety. In alternate embodiments, the wash composition is free of linear alkyl benzene sulfonic acid surfactants. As used herein, "free of" means the named component is present in an amount of about 1 weight percent or less, based on a total weight of the named composition (such as the wash composition), unless otherwise specified.

Suitable ionic surfactants that are cationic may include textile-softening substances of the general formula X, XI, or XII as illustrated below:

(X)

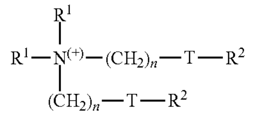

(XI)

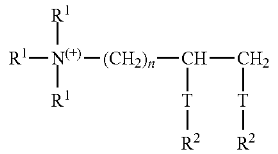

-continued (XII)

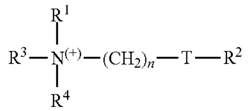

in which each $R^1$ group is mutually independently selected from among $C_{1-6}$ alkyl, alkenyl or hydroxyalkyl groups; each $R^2$ group is mutually independently selected from among $C_{8-28}$ alkyl or alkenyl groups; $R^3{=}R^1$ or $(CH_2)_n$-T-$R^2$; $R^4{=}R^1$ or $R^2$ or $(CH_2)_n$-T-$R^2$; T=—$CH_2$—, —O—CO—, or —CO—O—, and n is an integer from 0 to 5. The ionic surfactants that are cationic may include conventional anions of a nature and number required for charge balancing. Alternatively, the ionic surfactant may include anionic surfactants that may function to balance the charges with the cationic surfactants. In some embodiments, ionic surfactants that are cations may include hydroxyalkyltrialkylammonium compounds, such as $C_{12-18}$ alkyl(hydroxyethyl)dimethyl ammonium compounds, and may include the halides thereof, such as chlorides or other halides. The ionic surfactants that are cations may be especially useful for compositions intended for treating textiles.

Non-ionic surfactants may optionally be present in the wash composition at a concentration of from about 0 to about 60 weight percent, or from about 5 to about 50 weight percent, or from about 10 to about 40 weight percent, or from about 15 to about 30 weight percent in various embodiments, based on the total weight of the wash composition. Suitable non-ionic surfactants include alkyl glycosides and ethoxylation and/or propoxylation products of alkyl glycosides or linear or branched alcohols in each case having 12 to 18 C atoms in the alkyl moiety and 3 to 20, or 4 to 10, alkyl ether groups. In an exemplary embodiment, the non-ionic surfactant is an alcohol ethoxylate surfactant, but other compounds are also possible. Corresponding ethoxylation and/or propoxylation products of N-alkylamines, vicinal diols, fatty acid esters and fatty acid amides, which correspond to the alkyl moiety in the stated long-chain alcohol derivatives, may furthermore be used. Alkylphenols having 5 to 12 C atoms may also be used in the alkyl moiety of the above described long-chain alcohol derivatives.

Several other components may optionally be added to and included in the wash composition, including but not limited to water-binding saccharides, enzymes, peroxy compounds, bleach activators, anti-redeposition agents, pH adjusting agents, optical brighteners, foam inhibitors, bittering agents, dye transfer inhibitors, soil release agents, and other components. A partial, non-exclusive list of additional components that may be added to and included in the wash composition includes electrolytes, pH regulators, graying inhibitors, anti-crease components, processing aids, antimicrobial agents, and preservatives.

Water binding saccharides are optionally included in the wash composition. In some embodiments, the saccharide is selected from the group of fructose, glucose, sucrose, xylitol, sorbitol, mannitol, erythritol, dulcitol, inositol, adonitol, tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides, xylo-oligosaccharides, gentio-oligoscaccharides, sorbose, nigero-oligosaccharides, palatinose oligosaccharides, fucose, fractooligosaccharides, maltotetraol, maltotriol, malto-oligosaccharides, lactulose, melibiose, raffinose, rhamnose, ribose, high fructose corn/starch syrup, coupling sugars, soybean oligosaccharides, or glucose syrup, and mixtures thereof.

One example of a saccharide that may be utilized is high fructose corn syrup (HFCS.) HFCS typically refers to a blend of approximately 23% water and 77% saccharide. For example, HFCS 55 typically refers to a blend of water (about 23%), glucose (about 34%), and fructose (about 42%). However, in a dried form, HFCS 55 contains approximately 55% fructose by weight of dry HFCS, where the number after the abbreviation HFCS generally refers to the percentage of fructose in a dry state. Unless otherwise stated, HFCS used herein refers to a wet blend which contains water, as it is supplied from HFCS manufacturers. However, it should be understood that dry or essentially dry hybrids of monosaccharides (e.g. HFCS), wherein water has been removed partially or completely, can also be used. Other HFCS products may also be used, such as HFCS 42, HFCS 65, HFCS 90, and others. While pure fructose is very viscous and hard to handle, HFCS is more dilute and easier to handle. HFCS is also more cost-effective to manufacture. The United States Food and Drug Administration has even determined that HFCS is a safe ingredient for food and beverage manufacturing. It is certainly a safe and green ingredient for detergent products.

Foam inhibitors may optionally be included in the wash composition. Suitable foam inhibitors include, but are not limited to, soaps of natural or synthetic origin, which include an elevated proportion of $C_{18}$-$C_{24}$ fatty acids. Suitable non-surfactant foam inhibitors are, for example, organopolysiloxanes and mixtures thereof with microfine, optionally silanized silica as well as paraffins, waxes, microcrystalline waxes and mixtures thereof with silanized silica or bis-fatty acid alkylenediamides. Mixtures of different foam inhibitors may also be used, for example mixtures of silicones, paraffins or waxes. In an exemplary embodiment, coconut fatty acids are used as foam inhibitors, but other embodiments are possible, such as mixtures of paraffins and bistearylethylenediamide. The wash composition may include the foam inhibitor at an amount of from about 0 to about 15 weight percent, but in other embodiments the foam inhibitor may be present at an amount of from about 0.05 to about 10 weight percent, or an amount of from about 0.5 to about 8 weight percent, based on the total weight of the wash composition.

PH adjusting agents may be added to and included in the wash composition. Exemplary pH adjusting agents include monoethanol amine, binary amines, buffers, triethanol amine, metal hydroxides, or other materials. Exemplary metal hydroxides are sodium hydroxide and/or potassium hydroxide, and other possible pH adjusting agents include compounds that adjust the pH of the wash composition. pH adjusting agents may be present in the wash composition at an amount of from about 0.1 to about 10 weight percent in some embodiments, based on the total weight of the wash composition, but in other embodiments the pH adjusting agent may be present in the wash composition at an amount of from about 0.5 to about 5 weight percent, or an amount of from about 1 to about 4 weight percent, based on the total weight of the wash composition. The pH adjusting agent may be utilized to adjust the pH of the wash composition to from about 6 to about 10, or from about 6.5 to about 9.5, or from about 7 to about 9 in various embodiments. The pH adjusting agent may form a cation that combines with an anionic surfactant and/or a coconut fatty acid or other foam inhibitor and/or another anionic component within the wash composition. In many cases, the pH adjusting agent forms a salt with an anionic component. As such, the anionic surfactant may be present in the wash composition as a surfactant salt, and the coconut fatty acid may be present in the wash composition as a coconut fatty acid salt. In some embodiments, the pH adjusting agent is included in a slight excess relative to the anionic surfactant or other acidic components to adjust the pH of the wash composition to within a desired range, such as the range(s) mentioned above. As used herein, the terms "anionic surfactant" and "coconut fatty acid" include the neutralization products thereof.

Coconut fatty acids may optionally be utilized as a filler and as a stabilizing agent. Coconut fatty acids are relatively expensive, so non-aqueous solvent mixtures that allow for lower concentrations of coconut fatty acid while retaining a stable wash composition with good film haptics are desirable. The use of a reverse poloxamer allows for reduced concentrations of the coconut fatty acids in the wash composition. In an exemplary embodiment, the wash composition optionally includes coconut fatty acids at a concentration of from about 2 to about 15 weight percent, based on the total weight of the wash composition. However, in alternate embodiments, coconut fatty acids are present in the wash composition at from about 2 to about 10 weight percent, or from about 2 to about 7.5 weight percent, again based on the total weight of the wash composition.

Possible enzymes that may be in the wash composition contemplated herein include one or more of a protease, lipase, cutinase, amylase, carbohydrase, cellulase, pectinase, mannanase, arabinase, galactanase, xylanase, oxidase, (e.g., a laccase), and/or peroxidase, but others are also possible. In general, the properties of the selected enzyme(s) should be compatible with the selected wash composition, (i.e., pH-optimum, compatibility with other enzymatic and non-enzymatic ingredients, etc.). The detergent enzyme(s) may be included in the wash composition by adding separate additives containing one or more enzymes, or by adding a combined additive comprising all the enzymes that are added to the wash composition. The enzyme(s) should be present in the wash composition in effective amounts, such as from about 0 weight percent to about 5 weight percent of enzyme, or from about 0.001 to about 5 weight percent, or from about 0.001 to about 1 weight percent, or from about 0.2 to about 1 weight percent, or from about 0.5 to about 1 weight percent, based on the total weight of the wash composition, in various embodiments. In an exemplary embodiment, the wash composition includes three or more different enzymes. In one embodiment, the wash composition includes protease, mannanase, and amylase, but other embodiments are also possible.

A peroxy compound may optionally be present in the wash composition. Exemplary peroxy compounds include organic peracids or peracidic salts of organic acids, such as phthalimidopercaproic acid, perbenzoic acid or salts of diperdodecanedioic acid, hydrogen peroxide and inorganic salts that release hydrogen peroxide under the washing conditions, such as perborate, percarbonate and/or persilicate. Hydrogen peroxide may also be produced with the assistance of an enzymatic system, i.e. an oxidase and its substrate. Other possible peroxy compounds include alkali metal percarbonates, alkali metal perborate monohydrates, alkali metal perborate tetrahydrates or hydrogen peroxide. Peroxy compounds may be present in the wash composition at an amount of from about 0 to about 15 weight percent, or an amount of from about 1 to about 10 weight percent, or an amount of from about 3 to about 5 weight percent, based on the total weight of the wash composition, in various embodiments.

Bleach activators may optionally be added and included in the wash composition. Conventional bleach activators that form peroxycarboxylic acid or peroxyimidic acids under perhydrolysis conditions and/or conventional bleach-activating transition metal complexes may be used. The bleach activator optionally present may include, but is not limited to, one or more of: N- or O-acyl compounds, for example polyacylated alkylenediamines, such as tetraacetylethylenediamine; acylated glycolurils, such as tetraacetylglycoluril; N-acylated hydantoins; hydrazides; triazoles; urazoles; diketopiperazines; sulfurylamides and cyanurates; carboxylic anhydrides, such as phthalic anhydride; carboxylic acid esters, such as sodium isononanoylphenolsulfonate; acylated sugar derivatives, such as pentaacetyl glucose; and cationic nitrile derivatives such as trimethylammonium acetonitrile salts.

To avoid interaction with peroxy compounds during storage, the bleach activators may be coated with shell substances or granulated prior to addition to the wash composition, in a known manner. As such, the bleach activator and/or other components may be present in a liquid wash composition as a free or floating particulate. Exemplary embodiments of the coating or shell substance include tetraacetylethylenediamine granulated with the assistance of carboxymethylcellulose and having an average grain size of 0.01 mm to 0.8 mm, granulated 1,5-diacetyl-2,4-dioxohexahydro-1,3,5-triazine, and/or trialkylammonium acetonitrile formulated in particulate form. In alternate embodiments, the peroxy compounds and bleach activators, if present, may be within separate chambers of the container to prevent premature interactions. In various embodiments, the bleach activators may be present in the wash composition in quantities of from about 0 to about 8 weight percent, or from about 0 to about 6 weight percent, or from about 0 to about 4 weight percent, in each case relative to the total weight of the wash composition.

One or more anti-redeposition agents may also be optionally included in the wash composition. Anti-redeposition agents include polymers with a soil detachment capacity, which are also known as "soil repellents" due to their ability to provide a soil-repelling finish on the treated surface, such as a fiber. One example regarding polyesters includes copolyesters prepared from dicarboxylic acids, such as adipic acid, phthalic acid or terephthalic acid. In an exemplary embodiment, an anti-redeposition agents includes polyesters with a soil detachment capacity that include those compounds which, in formal terms, are obtainable by esterifying two monomer moieties, the first monomer being a dicarboxylic acid HOOC-Ph-COOH and the second monomer a diol $HO—(CHR^{11}—)_aOH$, which may also be present as a polymeric diol $H—(O—(CHR^{11}—)_a)_bOH$. Ph here means an ortho-, meta- or para-phenylene residue that may bear 1 to 4 substituents selected from alkyl residues with 1 to 22 C atoms, sulfonic acid groups, carboxyl groups and mixtures thereof. $R^{11}$ means hydrogen or an alkyl residue with 1 to 22 C atoms and mixtures thereof. "a" means a number from 2 to 6 and "b" means a number from 1 to 300. The polyesters obtainable therefrom may contain not only monomer diol units $—O—(CHR^{11}—)_aO—$ but also polymer diol units $—(O—(CHR^{11}—)_a)_bO—$. The molar ratio of monomer diol units to polymer diol units may amount to from about 100:1 to about 1:100, or from about 10:1 to about 1:10 in another embodiment. In the polymer diol units, the degree of polymerization "b" may be in the range of from about 4 to about 200, or from about 12 to about 140 in an alternate embodiment. The number average molecular weight of the polyesters with a soil detachment capacity may be in the range of from about 250 to about 100,000, or from about 500 to about 50,000 in an alternate embodiment. The acid on which the residue Ph is based may be selected from terephthalic acid, isophthalic acid, phthalic acid, trimellitic acid, mellitic acid, the isomers of sulfophthalic acid, sulfoisophthalic acid and sulfoterephthalic acid and mixtures thereof. Where the acid groups thereof are not part of the ester bond in the polymer, they may be present in salt form, such as an alkali metal or ammonium salt. Exemplary embodiments include sodium and potassium salts.

If desired, instead of the monomer HOOC-Ph-COOH, the polyester with a soil detachment capacity (the anti-redeposition agent) may include small proportions, such as no more than about 10 mole percent relative to the proportion of Ph with the above-stated meaning, of other acids that include at least two carboxyl groups. These include, for example, alkylene and alkenylene dicarboxylic acids such as malonic acid, succinic acid, fumaric acid, maleic acid, glutaric acid, adipic acid, pimelic acid, suberic acid, azelaic acid and sebacic acid. Exemplary diols $HO—(CHR^{11}—)_aOH$ include those in which $R^{11}$ is hydrogen and "a" is a number of from about 2 to about 6, and in another embodiment includes those in which "a" has the value of 2 and $R^{11}$ is selected from hydrogen and alkyl residues with 1 to 10 C atoms, or where $R^{11}$ is selected from hydrogen and alkyl residues with 1 to 3 C atoms in another embodiment. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. The polymeric diols include polyethylene glycol with a number average molar mass in the range from about 1000 to about 6000. If desired, these polyesters may also be end group-terminated, with end groups that may be alkyl groups with 1 to 22 C atoms or esters of monocarboxylic acids. The end groups attached via ester bonds may be based on alkyl, alkenyl and aryl monocarboxylic acids with 5 to 32 C atoms, or with 5 to 18 C atoms in another embodiment. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotic acid, melissic acid, and benzoic acid. These end groups may bear 1 to 5 substituents having a total of up to 25 C atoms, or 1 to 12 C atoms in another embodiment, for example tert-butylbenzoic acid. The end groups may also be based on hydroxymonocarboxylic acids with 5 to 22 C atoms, which for example include hydroxyvaleric acid, hydroxycaproic acid, ricinoleic acid, hydrogenation products thereof, hydroxystearic acid, and ortho-, meta- and para-hydroxybenzoic acid. The hydroxymonocarboxylic acids may in turn be joined to one another via their hydroxyl group and their carboxyl group and thus be repeatedly present in an end group. The number of hydroxymonocarboxylic acid units per end group, i.e. their degree of oligomerization, may be in the range of from 1 to 50, or in the range of from 1 to 10 in another embodiment. In an exemplary embodiment, polymers of ethylene terephthalate and polyethylene oxide terephthalate, in which the polyethylene glycol units have molar weights of from about 750 to about 5000 and the molar ratio of ethylene terephthalate to polyethylene oxide terephthalate of from about 50:50 to about 90:10, are used alone or in combination with cellulose derivatives. The anti-redeposition agent is present in the wash composition at an amount of from about 0 to about 5 weight percent, or an amount of from about 0 to about 4 weight percent, or an amount of from about 0 to about 3 weight percent, based on the total weight of the wash composition, in various embodiments.

Optical brighteners may optionally be included in the wash composition. Optical brighteners adsorb ultraviolet and/or violet light and re-transmit it as visible light, typically a visible blue light. Optical brighteners include, but are not limited to, derivatives of diaminostilbene disulfonic acid or the alkali metal salts thereof. Suitable compounds are, for example, salts of 4,4'-bis(2-anilino-4-morpholino-1,3,5-triazinyl-6-amino)stilbene 2,2'-disulfonic acid or compounds of similar structure which, instead of the morpholino group, bear a diethanolamino group, a methylamino group, an anilino group or a 2-methoxyethylamino group. Optical brighteners of the substituted diphenylstyryl type may furthermore be present, such as the alkali metal salts of 4,4'-bis(2-sulfostyryl)diphenyl, 4,4'-bis(4-chloro-3-sulfostyryl)diphenyl, or 4-(4-chlorostyryl)-4'-(2-sulfostyryl) diphenyl. Mixtures of the above-stated optical brighteners may also be used. Optical brighteners may be present in the wash composition at an amount of from about 0 to about 5 weight percent in some embodiments, but in other embodiments optical brighteners are present in an amount of from about 0.005 to about 5 weight percent, or an amount of from about 0.01 to about 0.5 weight percent, or an amount of from about 0.05 to about 0.3 weight percent, based on the total weight of the wash composition.

Bittering agents may optionally be added to hinder accidental ingestion of the unit dose pack or the wash composition. Bittering agents are compositions that taste bad, so children or others are discouraged from accidental ingestion. Exemplary bittering agents include denatonium benzoate, aloin, and others. Bittering agents may be present in the wash composition at an amount of from about 0 to about 1 weight percent, or an amount of from about 0.001 to about 0.5 weight percent, or an amount of from about 0.001 to about 0.25 weight percent in various embodiments, based on the total weight of the wash composition.

The wash composition may optionally include sodium sulfite. Sodium sulfite is an oxygen scavenger, where sodium sulfite reacts with oxygen to form sodium sulfate. Free oxygen, such as oxygen dissolved in the wash composition, can react to produce metal oxides (rust) that reduce the life of the washing equipment. The metal oxides can also stain garments, dishes, or other items being washed. Dissolved oxygen can also react to produce other components, and some of those components may be colored bodies. Therefore, the sodium sulfite can help reduce the formation of colored bodies in the wash composition. However, sodium sulfite includes sodium, and sodium-containing compounds tend to produce efflorescent solids in the film. In various embodiments, the sodium sulfite is present in the wash composition at a concentration of from about 0.05 to about 4 weight percent, or from about 0.05 to about 3 weight percent, or from about 0.05 to about 2 weight percent, all based on the total weight of the wash composition.

One or more chelating compounds may optionally be present in the wash composition at an amount of from about 0 to about 1.5 weight percent in an exemplary embodiment, but in alternate embodiments the chelating compound is present at an amount of from about 0 to about 1.25 weight percent, or an amount of from about 0 to about 1 weight percent, or an amount of from about 0 to about 0.5 weight percent, based on the total weight of the wash composition. Chelating compounds are sometimes referred to as water softeners. Many compounds can be used as chelating compounds, including but not limited to iminodisuccinate (IDS), ethylenediaminetetraacetic acid (EDTA), nitrilotriacetic acid, diethylenetriaminepenta(methylenephosphonic acid), nitrilotris(methylenephosphonic acid), 1-hydroxyethane-1,1-diphosphonic acid, ethylenediamine-N,N'-disuccinic acid (EDDS), hydroxyethylenediaminetriacetic acid (HEDTA), or other chelating compounds. In some embodiments, the reverse poloxamer may interact with a chelating compound, and so the wash composition may be free of a chelating compound in some embodiments.

One or more fragrances, or compounds that impart a desirable fragrance, may optionally be present in the wash composition in an amount of from about 0 to about 5 weight percent, based on the total weight of the wash composition. In alternate embodiments, the fragrance may be present in an amount of from about 0 to about 2 weight percent, or from about 0 to about 1 weight percent. The fragrance may be an encapsulated fragrance, or a combination of an encapsulated fragrance and fragrance that is not encapsulated, or just a fragrance that is not encapsulated. Encapsulation of fragrances prevents the fragrance from being released prematurely. The encapsulation may be ruptured at some time period after application to the garment, so fresh fragrance may be provided significantly after a garment is removed from a washing machine. The encapsulation may be ruptured by a wide variety of activities, such as physical contact from movement, melting, degradation from sunlight, degradation from oxidation, or other reasons. The encapsulation may be formed by aminoplast or cross-linked gelatin, polymeric materials, or other materials. The fragrance may be neat oil fragrance, an essential oil, botanical extracts, synthetic fragrance materials, or other compounds that provide a desirable odor.

Many film manufacturers caution against the use of sodium-containing compounds in a wash composition because sodium can cause efflorescence solids to form in the film. Efflorescence results when a component is carried into the film, and that component or a portion thereof precipitates within the film. The solubility of the efflorescence component may be different in the film than in the wash composition, but other reasons for the efflorescence may also be possible. In any event, efflorescence is undesirable because it causes a “cloudy”, opaque, or otherwise unattractive appearance of the film, as well as gritty or rough feel as opposed to a smooth feel for film free of efflorescence. A chelating compound binds and removes various metals from water, such as calcium, magnesium, sodium, or other metals.

The wash composition may be prepared by combining and mixing the components of the wash composition with a mixer. Once mixed, the wash composition is encapsulated in the container. The components of the wash composition may all be mixed at one time, or different components may be pre-mixed and then combined. A wide variety of mixers may be used in alternate embodiments, such as an agitator, an in-line mixer, a ribbon blender, an emulsifier, and others. The wash composition is placed in a container, and then the film of the container is sealed with a sealer, where the sealer may utilize heat, water, ultrasonic techniques, water and heat, pressure, or other techniques for sealing the container and forming the unit dose pack.

Another exemplary embodiment contemplated herein is directed to the use of a unit dose pack as described above in a cleaning process, such as laundry and/or hard surface cleaning. In particular, an embodiment is directed to the use of a unit dose pack in laundering of textile and fabrics, such as house hold laundry washing and industrial laundry washing. A further exemplary embodiment is directed to the use of a unit dose pack in hard surface cleaning such as automated dish washing (ADW).

The fabrics and/or garments subjected to a washing, cleaning or textile care process contemplated herein may be conventional washable laundry, such as household laundry. In some embodiments, the major part of the laundry is garments and fabrics, including but not limited to knits, woven fabrics, denims, non-woven fabrics, felts, yarns, and toweling. The fabrics may be cellulose based, such as natural cellulosics, including cotton, flax, linen, jute, ramie, sisal or coir or manmade cellulosics (e.g., originating from wood pulp) including viscose/rayon, ramie, cellulose acetate fibers (tricell), lyocell or blends thereof. The fabrics may also be non-cellulose based such as natural polyamides including wool, camel, cashmere, mohair, rabbit, and silk, or the fabric may be a synthetic polymer such as nylon, aramid, polyester, acrylic, polypropylene and spandex/elastin, or blends of any of the above-mentioned products. Examples of blends are blends of cotton and/or rayon/viscose with one or more companion material such as wool, synthetic fibers (e.g., polyamide fibers, acrylic fibers, polyester fibers, polyvinyl alcohol fibers, polyvinyl chloride fibers, polyurethane fibers, polyurea fibers, aramid fibers), and cellulose-containing fibers (e.g., rayon/viscose, ramie, flax, linen, jute, cellulose acetate fibers, lyocell).

In one embodiment, the fabrics and/or garments are added to a washing machine, and the unit dose pack is also added to the washing machine before wash water is added. In an alternate embodiment, the unit dose pack may be added to an automatic detergent addition system of a washing machine, where the contents of the unit dose pack are added to the wash water with the fabrics and/or garments after the washing process has begun. In yet another embodiment, the unit dose pack is manually added to the fabrics and/or garments with the wash water after the washing process has started. The film dissolves and releases the wash composition into the aqueous wash water. The film is dissolved and washes out of the washing machine with the excess wash water, so there is nothing to collect from the fabrics and/or garments after the wash cycle. The fabrics and/or garments are laundered with the wash water and the contents of the unit dose pack. The fabrics and/or garments may then be dried and processed as normal.

In an alternate embodiment, the unit dose pack is added to a detergent charging system for an automatic dish washing machine. The detergent charging system opens and releases the unit dose pack to the wash water and a main compartment of the dish washing machine at a designated point in the wash cycle.

Examples

Samples of test wash compositions were prepared with the ingredients listed in Table 1 below. The non-aqueous solvent portions of the samples were varied while the remainder of the test wash compositions were held constant, where three non-aqueous solvents were evaluated: glycerin; polyethylene glycol with an average number molecular weight of about 400 (PEG 400); and a reverse poloxamer (Pluronic® 5R5, available from BASF). Three trials were run for each test. Test polyvinyl film strips were exposed to the test wash compositions, and the haptics of the test polyvinyl film strips were measured.

TABLE 1

| Component | Sample 1 | Sample 2 | Sample 3 | Sample 4 | Sample 5 | Sample 6 | Sample 7 |
|---|---|---|---|---|---|---|---|
| Polyethylene glycol | 32.32 | 0 | 0 | 16.16 | 16.16 | 0 | 10.77 |
| Reverse poloxamer | 0 | 32.32 | 0 | 16.16 | 0 | 16.16 | 10.77 |
| Glycerin | 0 | 0 | 32.32 | 0 | 16.16 | 16.16 | 10.77 |
| non-ionic alcohol ethoxylate surfactant | 23.074 | 23.074 | 23.074 | 23.074 | 23.074 | 23.074 | 23.074 |
| Monoethanol amine | 1.75 | 1.75 | 1.75 | 1.75 | 1.75 | 1.75 | 1.75 |
| Zeolite water (does not include water listed as part of other components) | 7 | 7 | 7 | 7 | 7 | 7 | 7 |
| Linear alkyl benzene sulfonic acid | 5 | 5 | 5 | 5 | 5 | 5 | 5 |
| Coconut fatty acids | 4 | 4 | 4 | 4 | 4 | 4 | 4 |
| anionic sodium alcohol ethoxy sulfate surfactant (60% active in water and ethanol) | 26 | 26 | 26 | 26 | 26 | 26 | 26 |
| Bittering agent (25% active in propylene glycol) | 0.05 | 0.05 | 0.05 | 0.05 | 0.05 | 0.05 | 0.05 |
| Optical brightener | 0.2 | 0.2 | 0.2 | 0.2 | 0.2 | 0.2 | 0.2 |
| Fragrance | 0.585 | 0.585 | 0.585 | 0.585 | 0.585 | 0.585 | 0.585 |
| Colorant | 0.026 | 0.026 | 0.026 | 0.026 | 0.026 | 0.026 | 0.026 |

1. All compositions are listed as weight percent, based on a total weight of the wash composition.
2. All compositions are at least 99% active, unless otherwise specified.
3. Solvents in the compositions that are less than 100% active are not separately listed or totaled.

The test results are provided in Table 2 below. The haptics testing included a % weight difference, where the weight of the test polyvinyl film strips was measure before and after a 24 hour exposure period. A spring constant was also measured for the test polyvinyl film strips after the 24 hour exposure, where the spring constant is the force needed to pull and stretch the test film across a 2 millimeter distance. The test polyvinyl strips were initially 2.5 inches (6.35 centimeters) by 1 inch (2.54 centimeters). A % weight gain of 10% or more was set as a failure, and a spring constant of 1.32 newtons or less was set as a failure. The results of the testing were charted in a triangular chart that indicates the ratios of the three non-aqueous solvents tested and the results of the haptics tests (i.e., the % weight gain and the spring constant.) The triangular chart is presented in FIG. 1. Three trials were run for each of Samples 1-7, and the average results are listed in Table 2 below.

TABLE 2

| Test | Sample 1 | Sample 2 | Sample 3 | Sample 4 | Sample 5 | Sample 6 | Sample 7 |
|---|---|---|---|---|---|---|---|
| Initial weight | 0.28 | 0.27 | 0.28 | 0.28 | 0.28 | 0.26 | 0.28 |
| Post weight | 0.29 | 0.26 | 0.43 | 0.28 | 0.35 | 0.33 | 0.33 |
| % Weight gain | 4 | −4 | 57 | 2 | 25 | 23 | 17 |
| Spring constant | 4.44 | 4.09 | 0.96 | 3.93 | 1.63 | 1.35 | 2.04 |

1. Weights are in grams.

Reference is made to FIG. 1. The concentration of the reverse poloxamer is shown on the left side of the triangle, the concentration of glycerin is shown on the bottom side of the triangle, and the concentration of the polyethylene glycol is shown on the right hand side of the triangle. The spring constant failure area 10 is the smaller shaded area in the bottom left hand side of the chart. The spring constant failure area 10 shows the relative concentrations of the three tested non-aqueous solvents where the spring constant is greater than 1.32 newtons. The weight difference failure area 20 is the larger shaded area that covers most of the triangle and all of the bottom left hand side of the triangle. The weight difference failure area 20 overlies and encompasses the spring constant failure area 10. The weight difference failure area shows where the film weight gain was greater than 10%. The acceptable haptics area 30 is the non-shaded area on the right hand side of the triangle. The non-aqueous solvent mixes illustrated in the acceptable haptics area 30 have a spring constant of higher than 1.32 and a weight difference of less than 10%.

Efflorescence was tested for the reverse poloxamer solvent versus the polyethylene glycol solvent. The compositions of Samples 8, 9, 10, and 11 are listed in Table 3, below. The samples were then placed into monochamber unit dose packs at 24 grams of wash composition per unit dose pack. The film used was Aicello® GS-75 on both top and bottom. The samples were aged at 75° F., 105° F., 113° F., and 125° F. for 1 week. After aging 1 week, Samples 9 and 11 (with the reverse poloxamer) had no noticeable efflorescence on the film at any storage temperature. Samples 8 and 10 where not as transparent and felt rough, at all storage temperatures, due to effloresced salts on the film. Samples 9 and 11 were visually brighter than samples 8 and 10 at all storage temperatures as well. Therefore, the reverse poloxamer reduced efflorescence as compared to the polyethylene glycol.

TABLE 3

| Component | Sample 8 | Sample 9 | Sample 10 | Sample 11 |
|---|---|---|---|---|
| Glycerin | 14.992 | 14.992 | 12.038 | 12.0375 |
| Polyethylene glycol | 18.323 | 0 | 14.71 | 0 |
| Reverse poloxamer | 0 | 18.323 | 0 | 14.71 |
| Non-ionic alcohol ethoxylate surfactant | 23.074 | 23.074 | 23.074 | 23.074 |
| Monoethanolamide | 1.75 | 1.75 | 1.75 | 1.75 |
| Water (does not include water as listed in other components.) | 6 | 6 | 6 | 6 |
| Linear alkyl benzene sulfonic acid | 5 | 5 | 5 | 5 |
| Coconut fatty acid | 4 | 4 | 4 | 4 |
| Anionic sodium alcohol ethoxy sulfate surfactant (60% active in water and ethanol) | 26 | 26 | 26 | 26 |
| Bittering agent (25% active in propylene glycol) | 0.05 | 0.05 | 0.05 | 0.05 |
| Optical brightener | 0.2 | 0.2 | 0.3 | 0.3 |
| Fragrance A | 0.585 | 0.585 | 0 | 0 |
| Colorant | 0.026 | 0.026 | 0.026 | 0.026 |
| Protease enzyme (8% active in water and propylene glycol) | 0 | 0 | 2 | 2 |
| Mannanase enzyme (8% active in water and propylene glycol) | 0 | 0 | 0.6 | 0.6 |
| Amylase enzyme (8% active in water and propylene glycol) | 0 | 0 | 0.35 | 0.35 |
| Anti-redeposition polymer | 0 | 0 | 1.6 | 1.6 |
| Sodium amino disuccinate (34% active in water) | 0 | 0 | 0.9 | 0.9 |
| Fragrance B | 0 | 0 | 1.6 | 1.6 |

1. All compositions are listed as weight percent, based on a total weight of the wash composition.
2. All compositions are at least 99% active, unless otherwise specified.
3. Solvents in the compositions that are less than 100% active are not separately listed or totaled.
4. The non-ionic alcohol ethoxylate surfactant utilized had an average carbon chain length of 12 to 15 and 7 moles of ethoxylation.
5. The anionic sodium alcohol ethoxy sulfate surfactant utilized had an average carbon chain length of 12 to 14 and 3 moles of ethoxylation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A unit dose pack for laundry cleaning comprising:

a film; and a liquid wash composition encapsulated within the film, wherein the wash composition comprises:

a reverse poloxamer present in an amount of from about 3 to about 30 weight percent, glycerin present in an amount of from about 0 to about 30 weight percent, polyethylene glycol present in an amount of from about 0 to about 30 weight percent, an anionic sodium alcohol ethoxy sulfate surfactant present in an amount of from about 9 to about 18 weight percent, a non-ionic alcohol ethoxylate surfactant present in an amount of from about 15 to about 30 weight percent, and a linear alkylbenzene sulfonic acid present in an amount of from about 4 to about 8 weight percent, all based on a total weight of the wash composition;

wherein a weight ratio of the reverse poloxamer, polyethylene glycol, and glycerin falls within a region of a ternary plot, wherein the region is defined by six points of the ratio of reverse poloxamer:polyethylene glycol:glycerin:

(A) 1:0:0, (B) 0.75:0:0.25, (C) 0.5:0.3:0.2, (D) 0.17:0.68:0.15, (E) 0.03:0.81:0.16, (F) 0.03:0.95:0.02, wherein the viscosity of the wash composition is from about 100 to about 1,000 centipoise measured by a rotational viscometer at a temperature of 25 degrees Celsius (° C.).

2. The unit dose pack of claim 1, wherein the viscosity of the wash composition is from about 100 to about 300 centipoise measured by a rotational viscometer at a temperature of 25 degrees Celsius (° C.).

3. The unit dose pack of claim 1, wherein the wash composition further comprises a saccharide.

4. The unit dose pack of claim 1, wherein:

the wash composition further comprises one or more of ethanol, polypropylene glycol; polyethylene glycol esters; methyl ester ethoxylate; diethylene glycol;

dipropylene glycol; sorbitol; tetramethylene glycol; butylene glycol; pentanediol;

hexylene glycol; heptylene glycol; octylene glycol; 2-methyl-1,3-propanediol; xylitol;

mannitol; erythritol; dulcitol; inositol; adonitol; triethylene glycol; ethylene glycol monobutyl ether; diethylene glycol monobutyl ether; triethylene glycol monobutyl ether;

ethylene glycol monopropyl ether; diethylene glycol monoethyl ether; triethylene glycol monoethyl ether; diethylene glycol monomethyl ether; triethylene glycol monomethyl ether; tris (2-hydroxyethyl)methyl ammonium methylsulfate; ethylene oxide/propylene oxide copolymers with a number average molecular weight of 3,500 Daltons or less;

and ethoxylated fatty acids.

5. The unit dose pack of claim 4, wherein the wash composition comprises water present in an amount of from about 5 to about 35 weight percent, based on the total weight of the wash composition.

6. The unit dose pack of claim 1, wherein the wash composition is free of polyethylene glycol.

7. The unit dose pack of claim 1, wherein the reverse poloxamer comprises a polymer center and a plurality of polymer ends, wherein the polymer center primarily comprises polyethylene oxide and the plurality of the polymer ends primarily comprise polypropylene oxide.

8. The unit dose pack of claim 7, wherein the reverse poloxamer has a number average molecular weight of from about 300 to about 5,000 Daltons.

9. The unit dose pack of claim 1, wherein the wash composition comprises:

a coconut fatty acid present in an amount of from about 2 to about 10 weight percent, based on the total weight of the wash composition;

an optical brightener present in an amount of from about 0.01 to about 0.5 weight percent, based on the total weight of the wash composition; and an enzyme present in an amount of from about 0.001 to about 5 weight percent, based on the total weight of the wash composition.

10. The unit dose pack of claim 1, wherein the wash composition comprises the reverse poloxamer present in an amount of from 8 to about 20 weight percent.

11. A laundry cleaning unit dose pack comprising:

a film; and a liquid wash composition encapsulated within the film, wherein the wash composition comprises a reverse poloxamer present in an amount of from about 3 to about 30 weight percent, glycerin present in an amount of from about 0 to about 30 weight percent, and polyethylene glycol present in an amount of from about 0 to about 30 weight percent, all based on a total weight of the wash composition, wherein the wash composition comprises an anionic sodium alcohol ethoxy sulfate surfactant present in an amount of from about 3 to about 27 weight percent, based on the total weight of the wash composition, and wherein a weight ratio of the reverse poloxamer, polyethylene glycol, and glycerin falls within a region of a ternary plot, wherein the region is defined by six points of the ratio of reverse poloxamer:polyethylene glycol:glycerin:

(A) 1:0:0,
(B) 0.75:0:0.25,
(C) 0.5:0.3:0.2,
(D) 0.17:0.68:0.15,
(E) 0.03:0.81:0.16,
(F) 0.03:0.95:0.02.

12. The unit dose pack of claim 11, wherein the reverse poloxamer comprises the formula

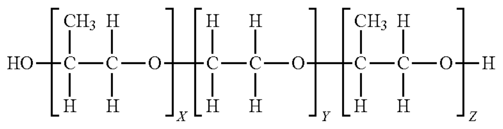

wherein X is from 1 to about 35, wherein Y is from 1 to about 35, and wherein Z is from about 1 to about 35.

13. The unit dose pack of claim 11, wherein the wash composition comprises:

glycerin present in an amount of from about 0 to about 30 weight percent, a non-ionic alcohol ethoxylate surfactant present in an amount of from about 10 to about 30 weight percent, monoethanol amine present in an amount of from about 0.1 to about 10 weight percent, and a linear alkylbenzene sulfonic acid present in an amount of from about 1 to about 15 weight percent, all based on the total weight of the wash composition.

14. The unit dose pack of claim 11, wherein the reverse poloxamer is a polymer having a polymer center and two polymer ends, wherein the polymer center primarily comprises ethylene oxide, and where each of the two polymer ends primarily comprise propylene oxide.

15. The unit dose pack of claim 14, wherein a ratio of propylene oxide to ethylene oxide in the reverse poloxamer is from about 90:10 to about 10:90.

16. The unit dose pack of claim 11, further comprising:

coconut fatty acid present in an amount of from about 2 to about 10 weight percent, based on the total weight of the wash composition.

17. The unit dose pack of claim 11, wherein the reverse poloxamer has a number average molecular weight of from about 300 to about 5,000 Daltons.

18. The unit dose pack of claim 11, wherein the reverse poloxamer is present in the wash composition at from about 8 to about 30 weight percent, based on the total weight of the wash composition.

19. The unit dose pack of claim 11, further comprising:

a coconut fatty acid present in an amount of from about 2 to about 10 weight percent, based on the total weight of the wash composition;

an optical brightener present in an amount of from about 0.01 to about 0.5 weight percent, based on the total weight of the wash composition; and an enzyme present in an amount of from about 0.001 to about 1 weight percent, based on the total weight of the wash composition.

* * * * *